United States Patent
Chae

(10) Patent No.: US 9,207,460 B2
(45) Date of Patent: Dec. 8, 2015

(54) PATTERNED RETARDER TYPE DISPLAY DEVICE HAVING BLACK STRIPS AND MANUFACTURING METHOD THEREFOR

(75) Inventor: Heeyoung Chae, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 49 days.

(21) Appl. No.: 13/566,995

(22) Filed: Aug. 3, 2012

(65) Prior Publication Data

US 2013/0293802 A1    Nov. 7, 2013

(30) Foreign Application Priority Data

May 2, 2012    (KR) .................. 10-2012-0046535

(51) Int. Cl.
*G02F 1/1335*    (2006.01)
*G02B 27/26*    (2006.01)
*G02B 5/20*    (2006.01)
(Continued)

(52) U.S. Cl.
CPC .............. *G02B 27/26* (2013.01); *G02B 5/201* (2013.01); *G02F 1/13363* (2013.01); *G02F 1/133512* (2013.01); *G02F 2001/133631* (2013.01); *Y10T 29/49826* (2015.01)

(58) Field of Classification Search
CPC ............ G02F 1/133512; G02F 1/136209; G02F 1/13394; G02F 2001/136222; G02F 1/134309; G02F 1/1335; G02F 2001/133638; G02F 1/133509; G02F 2001/133631; G02F 1/133514; G02F 1/1339; G02F 1/1341; G02F 2201/52; G02B 27/2214; G02B 27/2228; G02B 27/22; G02B 27/1066
USPC ................... 349/15, 106, 110, 111, 153, 155; 359/462
See application file for complete search history.

(56) References Cited

U.S. PATENT DOCUMENTS 5,969,850 A * 10/1999 Harrold et al. ................ 359/320
6,046,787 A * 4/2000 Nishiguchi .................... 349/129
(Continued)

FOREIGN PATENT DOCUMENTS

CN        101896842 A      11/2010
DE    10 2011 055 927       6/2012
(Continued)

OTHER PUBLICATIONS

German Patent and Trademark Office, Examination Report, File Ref. 10 2012 108 010.0, Feb. 4, 2013, twenty pages, English language portion only.
(Continued)

*Primary Examiner* — Paisley L Arendt
*Assistant Examiner* — Angela Davison
(74) *Attorney, Agent, or Firm* — Fenwick & West LLP

(57) ABSTRACT

The present disclosure relates to a patterned retarder type display device having a black strip and a method for manufacturing the same. The present disclosure suggests a patterned retarder type display device comprising: a first substrate having a display area in which unit pixels are disposed in a matrix type and a non-display area surrounding the display area; a second substrate joined with the first substrate by a sealant disposed in the non-display area; a liquid crystal layer disposed between the first substrate and the second substrate; a plurality of a horizontal black strip disposed along a horizontal border distinguishing the unit pixel on an outer surface of the first substrate; and an outer strip covering the non-display area on the outer surface of the first substrate.

14 Claims, 12 Drawing Sheets

(51) Int. Cl.
*G02F 1/13363* (2006.01)
*G02F 1/1333* (2006.01)
*G02F 1/1339* (2006.01)

(56) References Cited

U.S. PATENT DOCUMENTS

| | | | |
|---|---|---|---|
| 7,612,833 B2* | 11/2009 | Kim | 349/15 |
| 7,830,490 B2* | 11/2010 | Park | 349/153 |
| 2008/0266471 A1* | 10/2008 | Hisatake | 349/15 |
| 2009/0015763 A1 | 1/2009 | Woo et al. | |
| 2009/0122240 A1 | 5/2009 | Lim | |
| 2010/0225858 A1* | 9/2010 | Dong et al. | 349/106 |
| 2011/0234949 A1 | 9/2011 | Matsui et al. | |
| 2011/0267668 A1* | 11/2011 | Hagood et al. | 359/230 |
| 2011/0298792 A1 | 12/2011 | Lim | |

FOREIGN PATENT DOCUMENTS

| | | |
|---|---|---|
| JP | H06-018931 A | 1/1994 |
| JP | H10-268233 A | 10/1998 |
| JP | 2002-185983 A | 6/2002 |
| JP | 2011-158574 A | 8/2011 |
| KR | 10-2004-0016570 A | 2/2004 |
| KR | 10-2005-0034850 A | 4/2005 |
| KR | 10-2005-0097005 A | 10/2005 |
| KR | 10-2008-0033729 A | 4/2008 |
| WO | WO 2011/080968 A1 | 7/2011 |

OTHER PUBLICATIONS

Korean Intellectual Property Office, Office Action, Korean Patent Application No. 10-2012-0046535, Nov. 6, 2013, four pages (with English translation of concise explanation of relevance), Single English language sentence only considered.
Japanese Patent Office, Office Action, Japanese Patent Application No. 2012-151134, Jan. 14, 2014, six pages.
Chinese First Office Action, Chinese Application No. 201210286782.0, May 29, 2015, 13 pages.
German Office Action, German Application No. 102012108010.0, Jun. 30, 2015, 14 pp.

* cited by examiner

PATTERNED RETARDER TYPE DISPLAY DEVICE HAVING BLACK STRIPS AND MANUFACTURING METHOD THEREFOR

CROSS-REFERENCE TO RELATED APPLICATIONS

This application claims priority under 35 U.S.C. 119(a) to Korean Patent Application No. 10-2012-0046535 filed on May 2, 2012, which is incorporated herein by reference in its entirety.

BACKGROUND OF THE INVENTION

1. Field of the Invention

The present disclosure relates to a patterned retarder type display device having a black strip and a method for manufacturing the same. Especially, the present disclosure relates to a patterned retarder type display device having a black strip for preventing the cross-talk between the patterned retarder and for working as a black matrix, and an outer strip covering the non-display area and connecting with the black strip for working as a back surface electrode, and a method for manufacturing the same.

2. Discussion of the Related Art

Recently, thank to the advancement of the various video contents, the display devices which can selectively reproduce 2D images and 3D images are actively developed. For reproducing the 3D images, the display uses the stereoscopic technique or the autostereoscopic technique.

As one example of the glasses type, there is a 3D display device having a patterned retarder on the display panel. This 3D display device represents the 3D images using the polarization characteristics of the patterned retarder and the polarization glasses. Therefore, there is no cross-talk problem between the left eye image and the right eye image, and it ensure brighter luminescent so that the quality of the image is better than other type of 3D display device.

FIG. 1 is the perspective view illustrating the structure of a 3D display system having a patterned retarder according to the related art. The patterned retarder type 3D display system represents the 3D images using the polarization characteristics of the patterned retarder PR disposed on the display panel DP and those of the polarization glasses PG used by the observer.

Referring to FIG. 1, the patterned retarder type 3D display system includes a display panel DP representing 2D image or 3D image, a patterned retarder PR attached on the front surface of the display panel DP, and polarization glasses PG.

The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and the common electrode. Each liquid crystal cell is driven by the electric field formed between the pixel electrode connected to the thin film transistor and the common electrode. Each inside surface of the upper glass substrate SU and the lower glass substrate SL has an alignment layer, respectively for setting up the pre tilt angle of the liquid crystal. Each outside surface of the upper glass substrate SU and the lower glass substrate SL has the upper polarization film PU and the lower polarization film PL, respectively.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with $+\lambda/4$ (here, '$\lambda$' is the wavelength of the light incident from the pixel array). The second retarder RT2 can transmit the second circular polarized light by retarding the phase of the light with $-\lambda/4$ (actually, $+3\lambda/4$). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprise a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 1, by setting the polarized light characteristic of the left eye images different from that of the right eye images, the left eye image and the right eye images can be separately reached to the observer's left eye and right eye, respectively.

In the 3D display device having the film patterned retarder, as the left eye image and the right eye image are alternatively represented in the unit of pixel row, there are some cross-talk problems at the wide view angle along to the up-down directions. FIG. 2 is a cross sectional view along the cutting line A-A' in FIG. 1 illustrating that the cross-talk problem occurring at the 3D display device as shown in FIG. 1.

Referring to FIG. 2, when observing the video data at upper side (or lower side) than the straight front direction, the left eye image L1 and the right eye image R1 can transmit through the first patterned retarder RT1, at the same time. As a result, the cross-talk problem is occurred in which the left eye image L1 and the right eye image R1 pass through the left glass window LG of the polarization glasses PG, at the same time. Even though, there is a black matrix BM at the border between the pixels in horizontal units, the black matrix BM does not have enough width to prevent the cross-talk problem.

In order to solve this cross-talk problem in the vertical view angle direction, some methods have been suggested. The first method is to make the width of the black matrix BM wider so that the wide view angle in which the cross-talk problem is not occurred can be ensured. FIG. 3 is the cross-sectional view illustrating the 3D display device in which the black matrix BM has wider width than the black matrix BM shown in FIG. 2.

Referring to FIG. 3, on the light path at which the right eye images R1 passes through the first retarder RT1, a black matrix BM having wider width is disposed so that the right eye image R1 passing through the first retarder RT1 can be blocked. Therefore, when an observer located at the straight front of the display device moves up side or down side somewhat, the cross-talk problems are not occurred. However, in this structure, in order to prevent the cross-talk problem more effectively, the black matrix BM should have remarkably wider width. As the width of the black matrix BM is getting wider, the aperture ratio at the front direction is getting lowered and then the brightness may be degraded or the correct color cannot be represented.

As a result, there is a trade-off relationship between the front aperture ratio and the cross-talk improvement. Furthermore, it is hard to find proper point therebetween. Therefore, it would be beneficial to have a method for maintaining the front aperture ratio and reducing cross-talk at the same time.

SUMMARY OF THE INVENTION

In order to overcome the above mentioned drawbacks, embodiments of the present disclosure include a display device that maintains the front aperture ratio and reduces cross-talk at the same time and a method for manufacturing the same. Another embodiment of the present disclosure is a large area display device for 2D/3D video images without bezel area by forming the driving IC in the sealant area for ensuring the front aperture ratio and for enhancing the cross-talk problem at the same time and a method for manufacturing the same.

In order to accomplish the above purpose, the present disclosure suggests a patterned retarder type display device comprising: a first substrate having a display area in which a matraix of unit pixels are disposed and a non-display area surrounding the display area; a second substrate joined with the first substrate by a sealant disposed in the non-display area; a liquid crystal layer disposed between the first substrate and the second substrate; a plurality of first black strips disposed along first borders (e.g. horizontal black strips disposed along horizontal borders) distinguishing the unit pixels from each other on an outer surface of the first substrate; and an outer strip covering the non-display area on the outer surface of the first substrate. The outer surface of the first substrate faces away from the liquid crystal layer.

The second substrate includes: a gate line and a data line defining the unit pixel on an inner surface of the second substrate; a thin film transistor connecting to the gate line and the data line; a pixel electrode formed in the unit pixel and connected to the thin film transistor; and a driving element disposed in the non-display area.

The device further comprises a plurality of a second black strips disposed along second borders (e.g. vertical black strips disposed along vertical borders) distinguishing the unit pixels from each other on the outer surface of the first substrate. The second borders are perpendicular to the first borders.

The device further comprises a color filter formed in the unit pixel on the inner surface of the first substrate.

The device further comprises a color filter covering the pixel electrode and formed in the unit pixel, on the inner surface of the second substrate.

The device further comprises: a color filter disposed between the pixel electrode and the second substrate on the inner surface of the second substrate, wherein a difference between a light reflexibility of the pixel electrode and a light reflexibility of the outer strip is less than 5%.

The device further comprises: a color filter formed in the unit pixel on the inner surface of the first substrate; and a plurality of second black strips disposed along the first borders on the inner surface of the first substrate.

The device further comprises a column spacer disposed between the unit pixels for maintaining a cell gap between the first substrate and the second substrate, constantly.

The first black strips and the outer strip are connected each other, and include at least one of a molybdenum-titanium (Mo—Ti) alloy and a nitride copper (CuNx).

The device further comprises a patterned retarder disposed over the first black strips.

Furthermore, the present disclosure suggests a manufacturing method of a display device comprising: forming a first substrate including dividing an upper substrate into a display area having a matrix of unit pixels and a non-display area surrounding the display area, and forming a plurality of first black strips disposed along first borders distinguishing the unit pixels on an outer surface of the upper substrate and an outer strip covering the non-display area on the outer surface of the upper substrate; forming a second substrate including gate lines and data lines defining the unit pixels on an inner surface of the lower substrate, a thin film transistor connecting to the gate line and the data line, a pixel electrode formed in the unit pixel and connected to the thin film transistor, and a driving element disposed in the non-display area; and joining the first substrate and the second substrate by disposing a sealant within the non-display area and by facing an inner surface of the upper substrate and the inner surface of the lower substrate with a liquid crystal layer therebetween.

The method step for forming the first substrate further comprises: forming a plurality of second black strips disposed along second borders distinguishing the unit pixels from each other on the outer surface of the upper substrate.

The method step for forming the first substrate further comprises: forming a color filter in the unit pixel on the inner surface of the upper substrate; and forming a column spacer where overlapping with at least one of the first black strips and the second black strips.

The method step for forming the second substrate further comprises: forming a color filter covering the pixel electrode in the unit pixel on the inner surface of the lower substrate; and forming a column spacer where overlapping with at least one of the first black strips and the second black strips, on the color filter.

The step for forming the second substrate further comprises: forming a color filter in the unit pixel on the inner surface of the lower substrate, prior to forming the gate line, the data line, the thin film transistor and the pixel electrode; and forming a column spacer where overlapping with at least one of the horizontal black strip and the vertical black strip, on the pixel electrode, wherein a difference between a light reflexibility of the pixel electrode and a light reflexibility of the outer strip is less than 5%.

The step for forming the first substrate further comprises: forming a color filter in the unit pixel on the inner surface of the upper substrate; forming a plurality of a second black strips disposed along second borders distinguishing the color filter; and forming a column strip on the vertical black strip.

The first black strips and the outer strip are connected each other, and include at least one of a molybdenum-titanium (Mo—Ti) alloy and a nitride copper (CuNx).

The display device according to the present disclosure comprises a black strip overlapping with the black matrix to effectively prevent the cross-talk problem in 3D video images and to enough ensure the front aperture ratio. The present disclosure comprises an outer strip connecting to the black strip, covering the sealant area, and made of conductive material so that it can work as the back surface electrode for preventing the electrostatics without the back surface electrode. The present disclosure comprises the black strip on the outer surface of the upper substrate removing the black matrix so that it is possible for 3D mode to have a front aperture ratio the same with that of the 2D mode and to prevent the cross-talk problems effectively.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
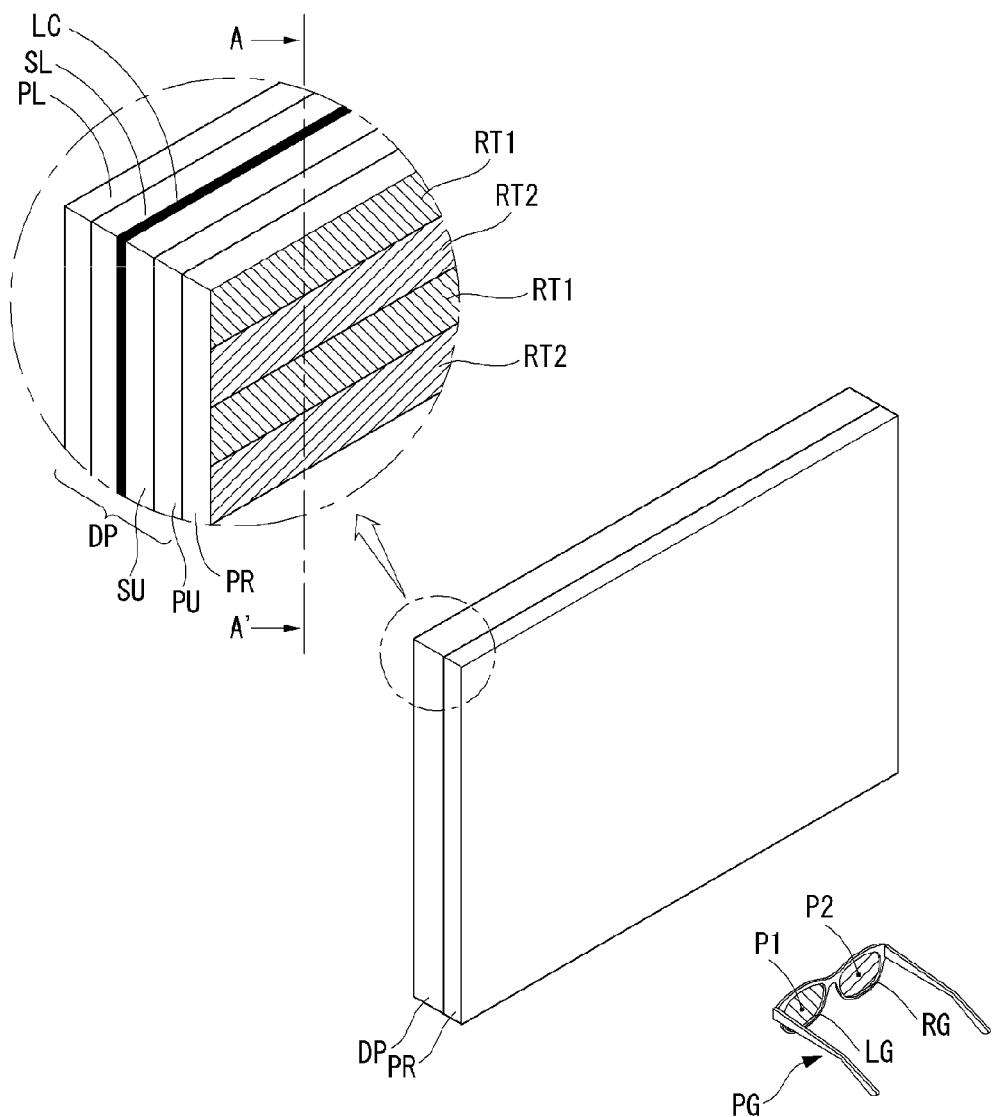
FIG. 1 is the perspective view illustrating the structure of a conventional 3D display system having a patterned retarder.
Figure 2:
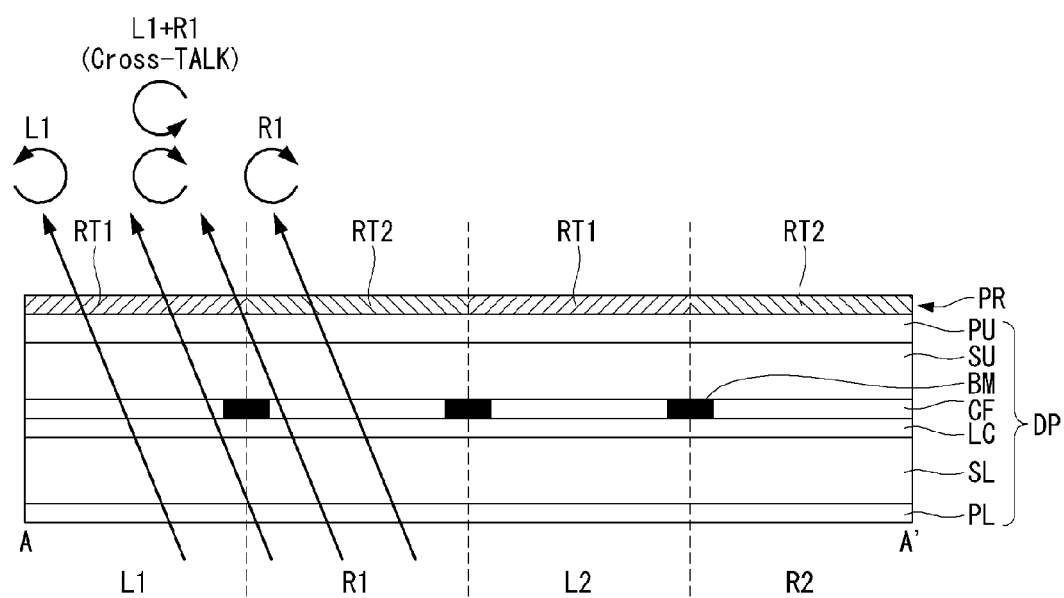
FIG. 2 is a cross sectional view along the cutting line A-A' in FIG. 1 illustrating that the cross-talk problem occurring at the 3D display device as shown in FIG. 1.
Figure 3:
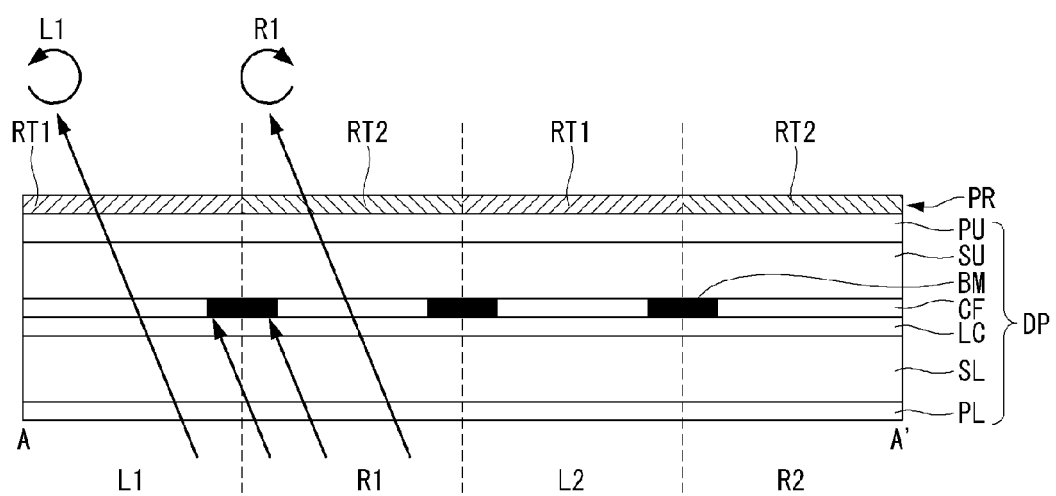
FIG. 3 is the cross-sectional view illustrating the 3D display device in which the black matrix having wider width than the width of black matrix shown in FIG. 2.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected for ease of explanation so that they may be different from actual names.

Figure 4:
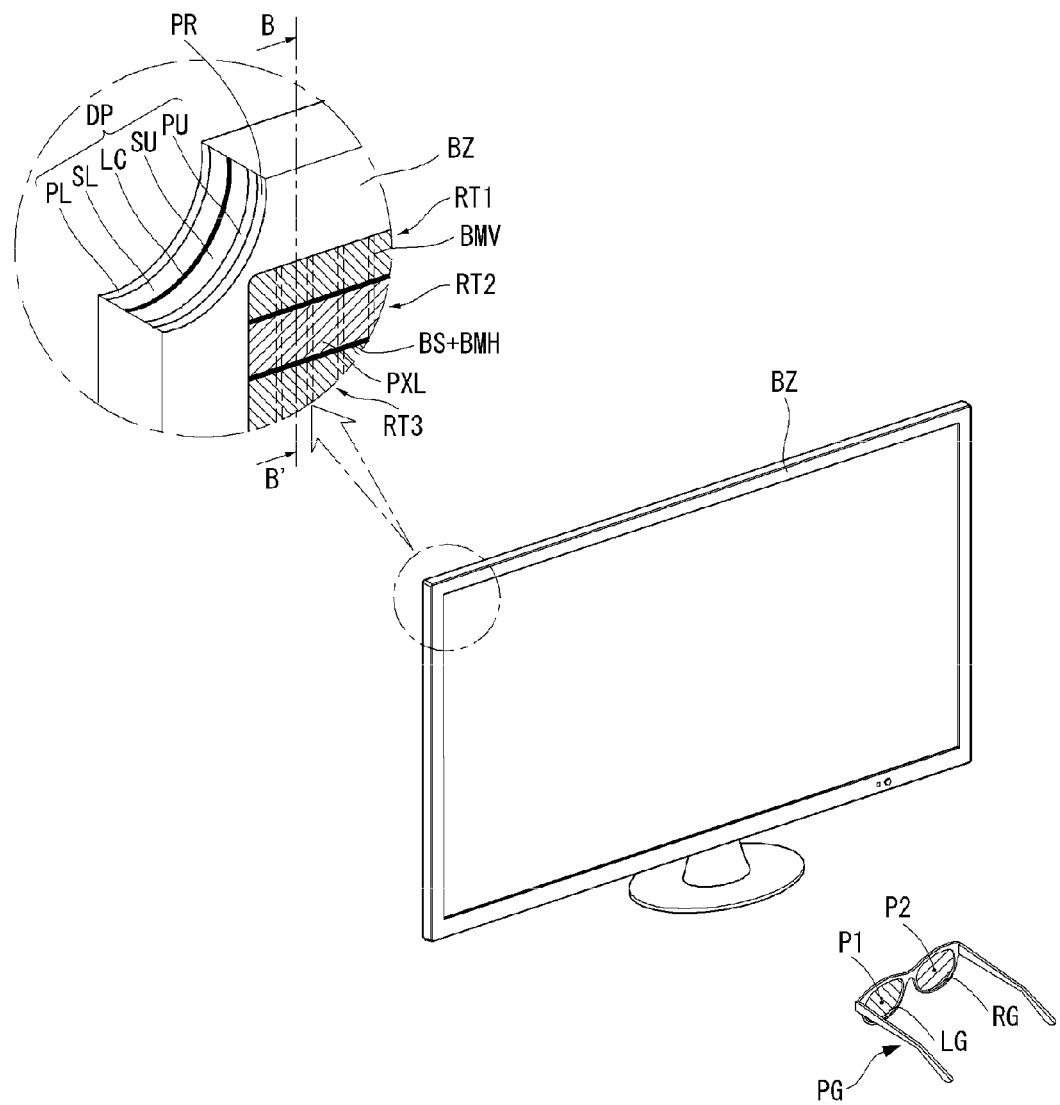
FIG. 4 is the perspective view illustrating the structure of a patterned retarder type 3D display panel having a double-black strip, according to the first embodiment of the present disclosure.

Referring to FIG. 4 and FIGS. 5A to 5D, we will explain the first embodiment according to the present disclosure. FIG. 4 is the perspective view illustrating the structure of a patterned retarder type 3D display panel having a double-black strip, according to the first embodiment of the present disclosure. FIGS. 5A to 5D are cross-sectional views illustrating the method for manufacturing the 3D display panel along the cutting line B-B' in FIG. 4, according to the first embodiment.

At first, referring to FIG. 4, the 3D display system according to the first embodiment of the present disclosure represents the 3D images using the polarization characteristics of the patterned retarder PR disposed on the display panel DP and those of the polarization glasses PG used by the observer.

As shown in FIG. 4, the patterned retarder type 3D display system includes a display panel DP representing 2D image or 3D image, a patterned retarder PR attached on the front surface of the display panel DP, and polarization glasses PG. The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data lines and the gate lines. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and/or the common electrode. Each liquid crystal cell is driven by the electric field formed between the pixel electrode connected to the thin film transistor and the common electrode. Each outside surface of the upper glass substrate SU and the lower glass substrate SL has the upper polarization film PU and the lower polarization film PL, respectively. They may be disposed in a manner that the light transmitting axes of them are perpendicularly crossed.

The patterned retarder PR is attached on the outside surface (i.e. the opposite surface to the upper glass substrate SU) of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with +λ/4 (here, 'λ' is the wavelength of the light incident from the pixel array). The second retarder RT2 can transmit the second circular polarized light by retarding the phase of the light with −λ/4 (actually, +3λ/4). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprise a left glass window LG having the first polarizing filter P1 and a right glass window RG having the second polarizing filter P2. The first polarizing filter P1 has the same light polarization characteristic as that of the first retarder RT1 of the patterned retarder PR. At the same time, the second polarizing filter P2 has the same light transmitting axis as that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 4, by setting the polarized light characteristic of the left eye images different from that of the right eye images, the left eye image and the right eye images can be separately reached to the observer's left eye and right eye, respectively.

When 3D video data is represented on the display panel DP, one left eye image or one right eye image are alternately displayed at every pixel row. The black strip BS for preventing the cross-talk problem between the left eye images and the right eye images is disposed on the outer surface of the upper substrate SU (i.e., between the upper substrate SU and the upper polarization film PU). The black strip BS has the same or narrower width than that of the horizontal black matrix BMH. The black strip BS is also disposed within an area that corresponds to the horizontal black matrix BMH formed on the inner surface of the upper substrate SU (i.e., between the upper substrate SU and the liquid crystal layer LC). Here, it is noted that an "outer" surface of an element indicates a surface thereof opposite to or away from a liquid crystal layer LC and an "inner" surface of the element indicates a surface thereof close to the liquid crystal layer LC. In FIG. 4, the vertical black matrix BMV is formed on the inner surface of the upper substrate SU so it is shown as the dotted line. On the contrary, the black strip BS overlapping with the horizontal black matrix BMH is formed on the outer surface of the upper substrate SU, so it is shown as the black solid strip.

Furthermore, in FIG. 4, the drawing symbol 'BZ' means the bezel area. The bezel area BZ includes the non-display area where the sealant is disposed to join the upper substrate SU and the lower substrate SL of the display panel DP, where the driving circuit is disposed and/or where some electrical elements connecting the driving circuit and display elements are formed.

Hereinafter, referring to FIGS. 5A to 5D, we will explain the manufacturing method for the patterned retarder type 3D display device panel according to the first embodiment of the present disclosure, in detail.

Figure 5A:
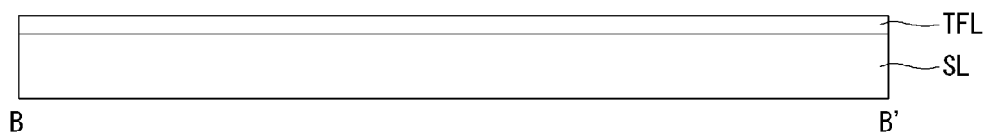
FIGS. 5A to 5D are cross-sectional views illustrating the method for manufacturing the 3D display panel along the cutting line B-B' in FIG. 4, according to the first embodiment.

At first, for the thin film transistor substrate, a transparent lower substrate SL is prepared. As shown in FIG. 5A, on the inner surface of the transparent lower substrate SL, the pixel areas disposed in a matrix type are defined by forming the gate lines and the data lines crossing each other. In each pixel area, thin film transistor and the pixel electrode driven by the thin film transistor are formed. In the FIG. 5A, the layer including the display driving elements such as the thin film transistors and the pixel electrodes are illustrated as the thin film transistor layer TFL, simply.

Figure 5B:
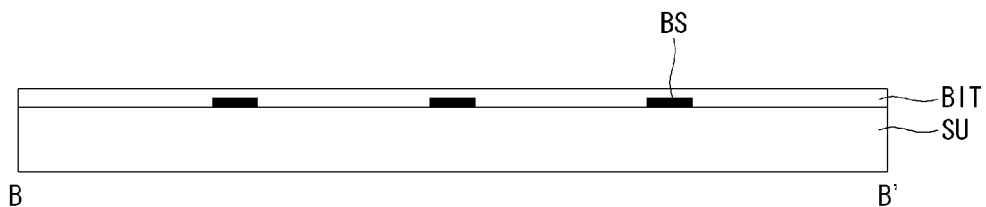

Next, for the color filter substrate, a transparent upper substrate SU is prepared. As shown in FIG. 5B, on one surface (i.e., outer surface), a black strip BS is formed. Specifically, the display panel DP according to the present disclosure has the patterned retarder PR running in horizontal direction, so the black strip BS is preferably disposed between each unit patterned retarders RT1 and RT2. In order to prevent the cross-talk problem effectively and to ensure enough aperture ratio of the display panel DP, the width of the black strip BS is preferably the same with or less than that of the black matrix BM. Furthermore, the black strip BS having the same width with that of the black matrix BM is preferably disposed as overlapping with the black matrix BM on the vertical space to the upper substrate SU.

For example, in the case of small area display panel such as a portable personal digital device and/or notebook computer, it is preferable that the black strip BS is completely overlapped with the horizontal black matrix BMH on the vertical space. On the contrary, on the case of large area display panel such as TV monitor, the black strip BS may be overlapped with some area of the horizontal black matrix BMH, in order to ensure optimized view condition at the central position of the up-down view angle in front of the display panel.

On the whole surface on which the black strips BS are formed, a back surface electrode BIT is disposed. The back surface electrode BIT is for removing the static electricity which may be charged during the manufacturing of the display panel DP.

Figure 5C:
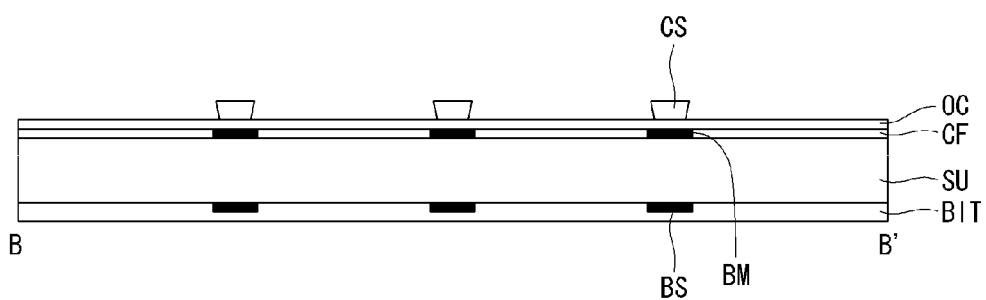

As shown in FIG. 5C, turning over the upper substrate SU, the black matrix BM is formed on the other surface (i.e. inner surface on which the back surface electrode BIT is not formed). The black matrix BM, as the border line distinguishing the pixel area, includes the horizontal black matrix BMH running to the horizontal direction of the display panel DP, and the vertical black matrix BMV running to the vertical direction of the display panel DP. For example, the horizontal black matrix BMH is disposed at the area corresponding to the gate line, and the vertical black matrix BMV is dispose at the area corresponding to the data line. Here, the horizontal black matrix BMH is preferably disposed as (completely or partially) overlapping with the black strip BS on the vertical space. As a result, the color filter area corresponding to the pixel area can be defined by the black matrix BM.

After that, within the color filter area, the color filter CF is formed. In some cases, the color filter may be formed prior to the black matrix BM. On the color filter CF, the over coat layer OC is disposed as covering the whole surface. Even though it is not shown in drawings, on the over coat layer OC, the alignment layer for deciding the initial alignment of the liquid crystal molecules may be further disposed. Otherwise, the over coat layer OC itself may be used as the alignment layer. On the over coat layer OC, the column spacer CS is formed for maintaining the cell gap between the thin film transistor substrate and the color filter substrate. The column spacer CS is preferably formed to overlapp the black matrix BM on the vertical space to the upper substrate SU.

Figure 5D:
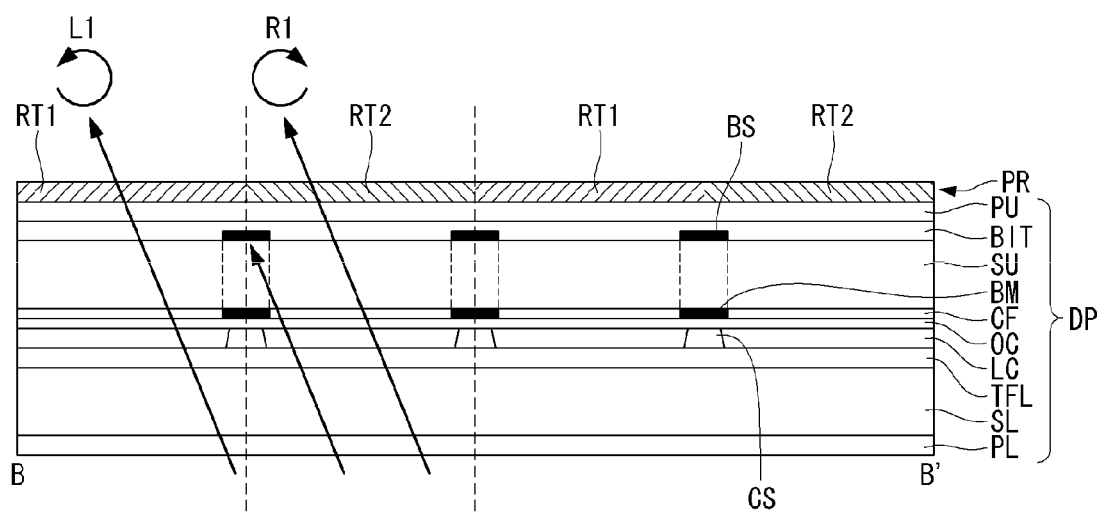

As shown in FIG. 5D, the thin film transistor substrate and the color filter substrate are joined each other with the liquid crystal layer LC therebetween. By the column spacer CS, the cell gap between the upper substrate SU and the lower substrate SL can be maintained constantly. On the outer surface (i.e., the opposite surface to the transistor layer TFL) of the lower substrate SL, the lower polarization film PL is attached. In the same manner, on the outer surface of the upper substrate SU (i.e., the surface thereof on which the back surface electrode BIT is formed), the upper polarization film PU is attached. Furthermore, on the outer surface opposite to the back surface electrode BIT of the upper polarization film PU, the patterned retarder PR for representing the 3D images is attached. Especially, the patterned retarder PR is preferably formed in film type.

Referring to FIG. 5D again, the black strip BS overlaps with the black matrix BM, especially the horizontal black matrix BMH. Further, when seeing it from the front direction of the liquid crystal display device, it is important to decide the overlapping area in manner that the whole areas including the black strip BS and the horizontal black matrix BMH should not degrade the front aperture ratio of the display panel. For example, in the cases of small area display panel such as the portable personal display device, it is preferable that the black strip BS and the horizontal black matrix BMH would have the same width and be completely overlapping with each other. However, in the cases of large area display panel such as TV monitor, the black strip BS may be overlapped with some portions of the horizontal black matrix BMH. In these cases, the black strip BS has a width that is the same as or less than a width of the horizontal black matrix BMH. The black strip BS also overlaps with some portions of the horizontal black matrix BMH. The overlapping structure should be decided in manner that, when viewing in front direction, the areas of the black strip BS which are not overlapped with the horizontal black matrix BMH should not degrade the aperture ratio of the display panel. As a result, when the 3D video images are represented, it is possible to ensure the same front brightness when the 2D video images are represented.

Furthermore, as the black strip BS and the black matrix BM are formed on the outer surface and on the inner surface of the upper substrate SU, respectively, it has the double black strip structure (as the black matrix BM works like the black strip) in which two black strips are overlapping with the thickness of the upper substrate SU. Therefore, the cross-talk between the left-eye image and the right-eye image can be effectively prevented.

Figure 6:
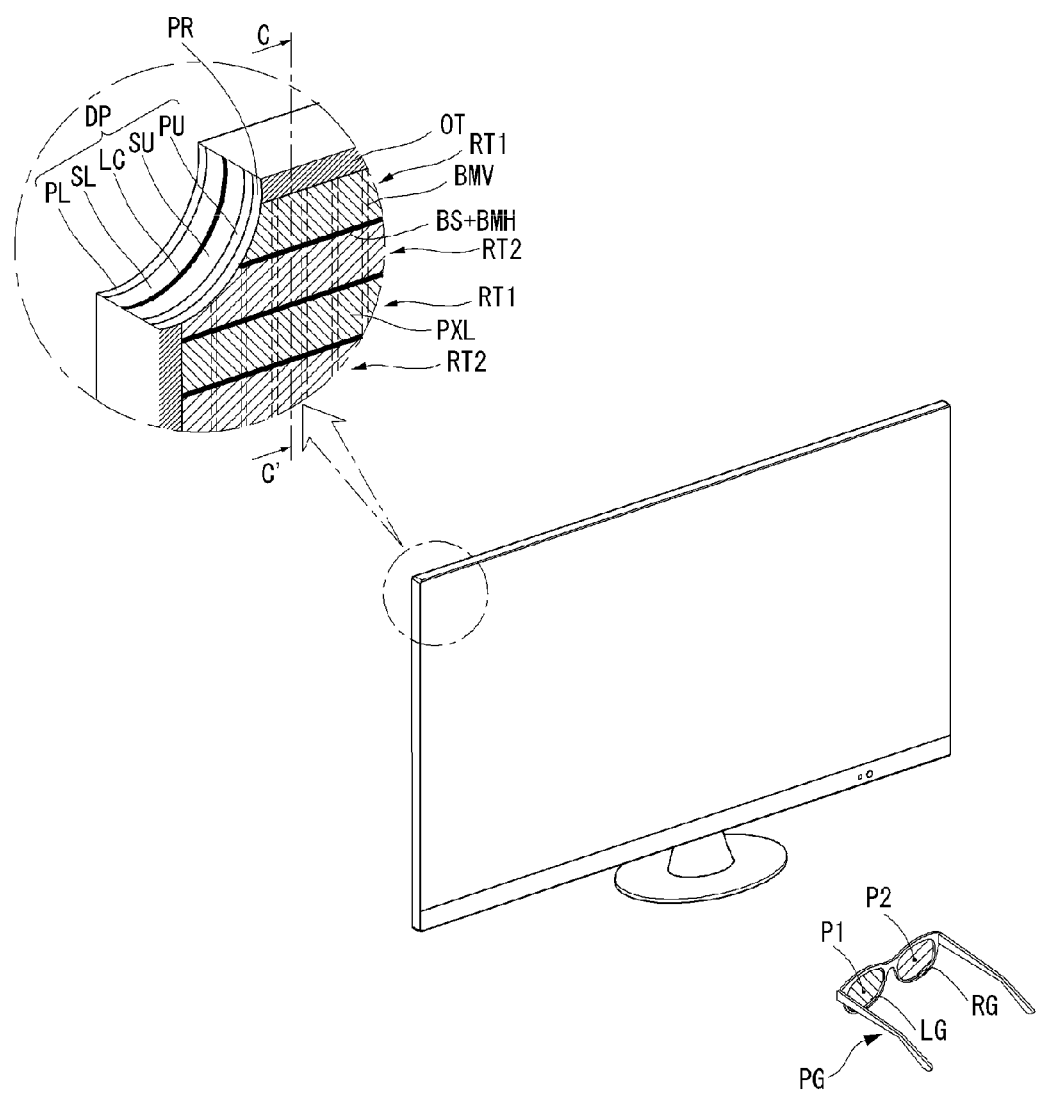
FIG. 6 is the perspective view illustrating the structure of a patterned retarder type 3D display panel having a double-black strip and an outer strip, according to the second embodiment of the present disclosure.

Hereinafter, referring to FIG. 6 and FIGS. 7A to 7D, we will explain the second embodiment according to the present disclosure. FIG. 6 is the perspective view illustrating the structure of a patterned retarder type 3D display panel having a double-black strip and an outer strip, according to the second embodiment of the present disclosure. FIGS. 7A to 7D are cross-sectional views illustrating the method for manufacturing the 3D display panel along the cutting line C-C' in FIG. 6, according to the second embodiment.

The 3D display device panel according to the second embodiment of the present disclosure is similar to the first embodiment. The difference is that there is substantially no bezel area in which the gate driver IC GIC (not shown) is directly formed within the sealant area SE (not shown) for sealing the lower substrate SL and the upper substrate SU. Hereinafter, the detail explanation for the same portions with the first embodiment may not be mentioned.

At first, referring to FIG. 6, the display panel DP has no bezel area. It has an outer strip OT disposed on the outer surface and at the four sides of the upper substrate SU corresponding to the sealant area SE for sealing the upper substrate SU and the lower substrate SL. It is preferable that the outer strip OT is formed when the black strip BS is formed with the same material thereof.

In the first embodiment, as the black strip BS running to the horizontal direction is formed on the outer surface of the upper substrate SU, all black strips BS are not connected each other. However, in the second embodiment, all black strips BS are connected to each other through the outer strip OT. In some cases, the black strips BS may not connected to each other via the outer strip OT and are isolated from each other. In the case that the black strips BS are connected each other through the outer strip OT, by making of opaque metal material, the black strip BS and the outer strip OT may work as the back surface electrode BIT in the first embodiment, even though the back surface electrode BIT is not formed on the black strip BS. In this case, it is preferable that the black strip BS and the outer strip OT include the opaque metal material having good adhesiveness on the material of the upper substrate SU and excellent abrasion resistance such as the molybdenum-titanium (Mo—Ti) alloy or the nitride copper (CuNx).

Referring to FIGS. 7A to 7D, we will explain the method for manufacturing the patterned retarder type 3D display device having the black strips according to the second embodiment of the present disclosure, in detail.

Figure 7A:
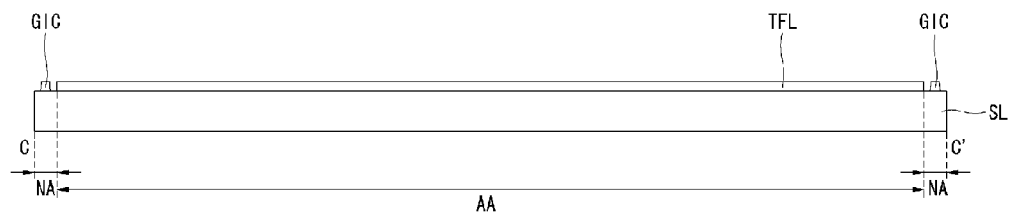
FIGS. 7A to 7D are cross-sectional views illustrating the method for manufacturing the 3D display panel along the cutting line C-C' in FIG. 6, according to the second embodiment.

At first, for the thin film transistor substrate, a transparent lower substrate SL is prepared. As shown in FIG. 7A, on the inner surface of the transparent lower substrate SL, the pixel areas disposed in a matrix type are defined by forming the gate lines and the data lines crossing each other. In each pixel area, thin film transistor and the pixel electrode driven by the thin film transistor are formed. In the FIG. 7A, the layer including the display driving elements such as the thin film transistors and the pixel electrodes are illustrated as the thin film transistor layer TFL.

The thin film transistor layer TFL defining the pixel area is disposed in the display area AA for representing the video data. And, the outer area of the display area AA can be defined as the non-display area NA. The non-display area NA is the area in which the sealant SE is disposed for joining and sealing the upper substrate SU and the lower substrate SL. In the non-display area NA, further, the gate driving IC GIC for driving the thin film transistor layer TFL can be formed. It is preferable that the gate driving IC GIC is formed with thin film transistors similar to those found in the thin film transistor layer TFL. That is, the gate driving IC GIC according to the second embodiment has much smaller size than the driving IC mounted on the lower substrate SL in the first embodiment, and formed on the lower substrate SL directly.

Figure 7B:
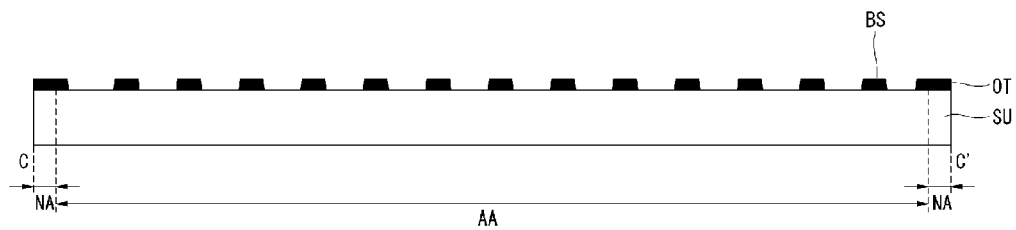

Next, for the color filter substrate, a transparent upper substrate SU is prepared. As shown in FIG. 7B, on one surface (i.e., outer surface), the black strip BS and an outer strip OT are formed. Especially, the display panel DP according to the present disclosure has the patterned retarder PR running in horizontal direction, so the black strip BS is preferably disposed between each unit patterned retarders RT1 and RT2. In order to prevent the cross-talk problem effectively and to ensure enough aperture ratio of the display panel DP, the width of the black strip BS is preferably the same with or less than that of the horizontal black matrix BMH. Furthermore, the black strip BS having the substantially same width with that of the horizontal black matrix BMH is preferably disposed as overlapping with the horizontal black matrix BMH on the vertical space to the upper substrate SU.

For example, on the case of small area display panel such as the portable personal digital device and/or notebook computer, it is preferable that the black strip BS is completely overlapped with the horizontal black matrix BMH in the vertical space. On the contrary, on the case of large area display panel such as TV monitor, the black strip BS may be overlapped with some areas of the horizontal black matrix BMH, in order to ensure optimized view condition at the central position of the up-down view angle in front of the display panel.

In the interim, the outer strip OT is preferably formed as covering the non-display area NA. Especially, the outer strip OT may connect all black strips BS on the outer surface of the upper substrate SU and be disposed at the four sides of the upper substrate SU surrounding the display area AA. Furthermore, as the black strip BS and the outer strip OT include the opaque metal material, they work as the back surface electrode BIT in the first embodiment. That is, without the back surface electrode BIT, the black strip BS and the outer strip OT can remove the static electricity which may be charged during the manufacturing of the display panel DP.

Figure 7C:
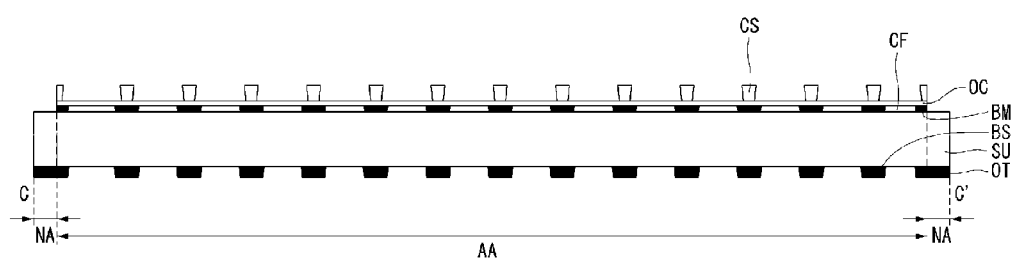

As shown in FIG. 7C, turning over the upper substrate SU, the black matrix BM is formed on the other surface (i.e. inner surface on which the black strip BS and the outer strip OT are not formed). The black matrix BM, as the border line distinguishing the pixel area, includes the horizontal black matrix BMH running to the horizontal direction of the display panel DP, and the vertical black matrix BMV running to the vertical direction of the display panel DP. For example, the horizontal black matrix BMH is disposed at the area corresponding to the gate line, and the vertical black matrix BMV is disposed at the area corresponding to the data line. Here, the horizontal black matrix BMH is preferably disposed as (completely or partially) overlapping with the black strip BS on the vertical space to the upper substrate SU. As a result, the color filter area corresponding to the pixel area can be defined by the black matrix BM.

After that, within the color filter area, the color filter CF is formed. In some cases, the color filter may be formed prior to the black matrix BM. On the color filter CF, the over coat layer OC is disposed as covering the whole surface. Even though it is not shown in drawings, on the over coat layer OC, an alignment layer for deciding the initial alignment of the liquid crystal molecules may be further disposed. Otherwise, the over coat layer OC itself may be used as the alignment layer. On the over coat layer OC, the column spacer CS is formed for maintaining the cell gap between the thin film transistor substrate and the color filter substrate. The column spacer CS is preferably formed within the area of the black matrix BM.

Figure 7D:
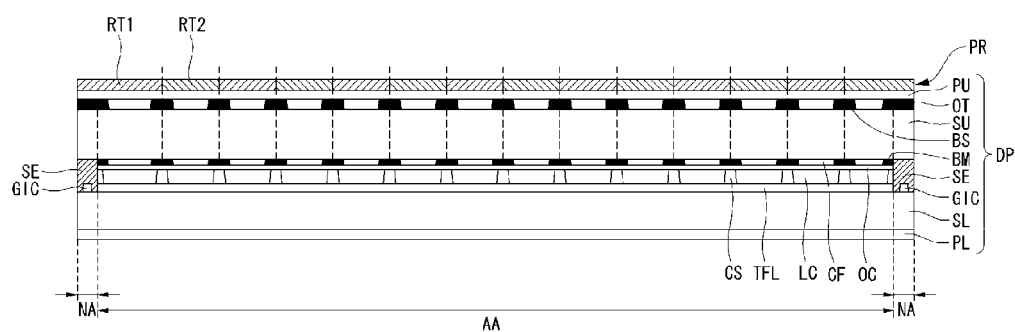

As shown in FIG. 7D, the thin film transistor substrate and the color filter substrate are joined each other with the liquid crystal layer LC therebetween. By the column spacer CS, the cell gap between the upper substrate SU and the lower substrate SL can be maintained constantly. The upper substrate SU and the lower substrate SL are completely sealed by the sealant SE disposed in the non-display area NA. On the outer surface (i.e., the opposite surface to the thin film transistor layer TFL) of the lower substrate SL, the lower polarization film PL is attached. In the same manner, on the outer surface (i.e., the surface on which the black strip BS and outer strip OT are formed) of the upper substrate SU, the upper polarization film PU is attached. Furthermore, on the upper polarization film PU, the patterned retarder PR for representing the 3D images is attached. Especially, the patterned retarder PR is preferably formed in film type.

Referring to FIG. 7D again, the black strip BS is overlapped with the black matrix BM, especially the horizontal black matrix BMH. Further, when seeing it from the front direction of the liquid crystal display device, it is important to decide the overlapping area in manner that the whole areas including the black strip BS and the horizontal black matrix BMH should not degrade the front aperture ratio of the display panel. For example, in the cases of small area display panel such as the portable personal display device, it is preferable that the black strip BS and the horizontal black matrix BMH would have the same width and be completely overlapped each other. However, in the cases of large area display panel such as TV monitor, the black strip BS may be overlapped with some portions of the horizontal black matrix BMH. In these cases, the black strip BS may have a width that is the same as or less than the width of the horizontal black matrix BMH and be overlapped with some portions of the horizontal black matrix BMH. The overlapping structure should be decided in manner that, when viewing in front direction, the areas of the black strip BS which are not overlapped with the horizontal black matrix BMH should not degrade the aperture ratio of the display panel. As a result, when the 3D video images are represented, it is possible to ensure the same front brightness as when the 2D video images are represented.

Furthermore, as the black strip BS and the black matrix MB are formed on the outer surface and on the inner surface of the upper substrate SU, respectively, it has the double black strip structure (as the black matrix works like the black strip) in which two black strips are overlapping with the thickness of the upper substrate SU. Therefore, the cross-talk between the left-eye image and the right-eye image can be effectively prevented.

Figure 8:
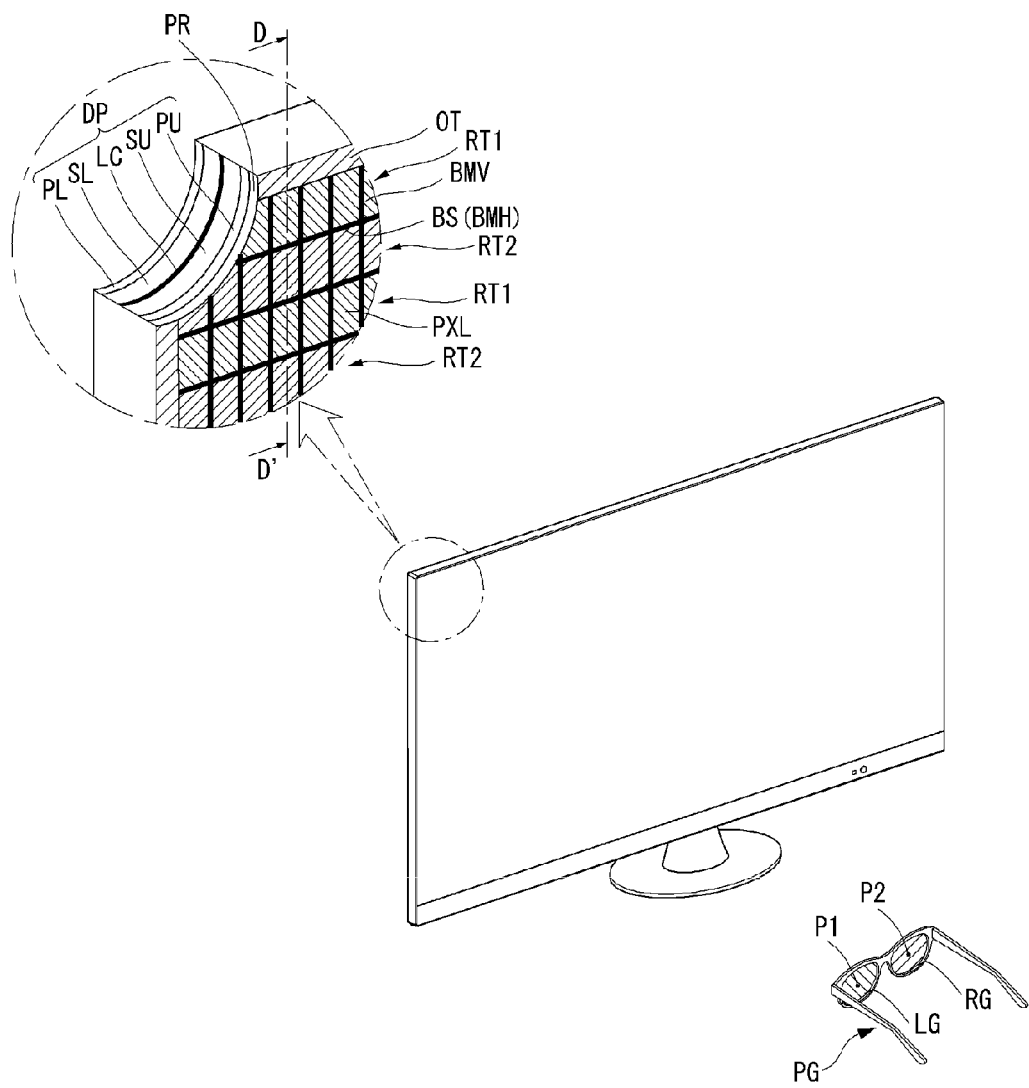
FIG. 8 is the perspective view illustrating the structure of a patterned retarder type 3D display panel having a double-black strip and an outer strip, according to the third embodiment of the present disclosure.

Hereinafter, referring to FIG. 8 and FIGS. 9A to 9D, we will explain the third embodiment according to the present disclosure. FIG. 8 is the perspective view illustrating the structure of a patterned retarder type 3D display panel having a double-black strip and an outer strip OT, according to the third embodiment of the present disclosure. FIGS. 9A to 9D are cross-sectional views illustrating the method for manufacturing the 3D display panel along the cutting line D-D' in FIG. 8, according to the third embodiment.

At first, referring to FIG. 8, the display panel DP according to the third embodiment, like the second embodiment, does not have bezel area. It has an outer strip OT that is disposed on the outer surface and at the four sides of the upper substrate SU corresponding to the sealant area SE (not shown) for sealing the upper substrate SU and the lower substrate SL. It is preferable that the outer strip OT is formed when the black strip BS is formed with the same material thereof. Furthermore, unlike the second embodiment, in the third embodiment, the black matrix BM is formed not on the inner surface of the upper substrate SU, but on the outer surface of the upper substrate SU. That is, the black matrix BM, the black strip BS and the outer strip OT are formed on the outer surface of the upper substrate SU.

In another words, there is no black matrix BM on the inner surface of the upper substrate SU, but on the outer surface of the upper substrate SU, the black strip BS (or horizontal black strip and vertical black strip) instead of black matrix BM is formed. In FIG. 8, as the vertical black strip BMV, and the black strip BS having the function of the horizontal black strip BMH (in other words, horizontal black strip and vertical black strip) are formed on the outer surface of the upper substrate SU, they are shown as the solid black strip.

Furthermore, in the third embodiment, the vertical black matrix BMV and the black strips BS having the horizontal black matrix BMH are connected through the outer strip OT. In some cases, the black strips BS may not connected each other via the outer strip OT and are isolated from each other. In the case that the vertical black matrix BMV and the black strips BS are connected to each other through the outer strip OT, by making of opaque metal material, the vertical black matrix BMV, the black strip BS and the outer strip OT may work as the back surface electrode BIT in the first embodiment, even though the back surface electrode BIT is not formed on the black strip BS. In this case, it is preferable that the vertical black matrix BMV, the black strip BS and the outer strip OT include the opaque metal material having good adhesiveness on the material of the upper substrate SU and excellent abrasion resistance such as the molybdenum-titanium (Mo—Ti) alloy or the nitride copper (CuNx).

Referring to FIGS. 9A to 9D, we will explain the method for manufacturing the patterned retarder type 3D display device having the black strips according to the third embodiment of the present disclosure, in detail.

Figure 9A:
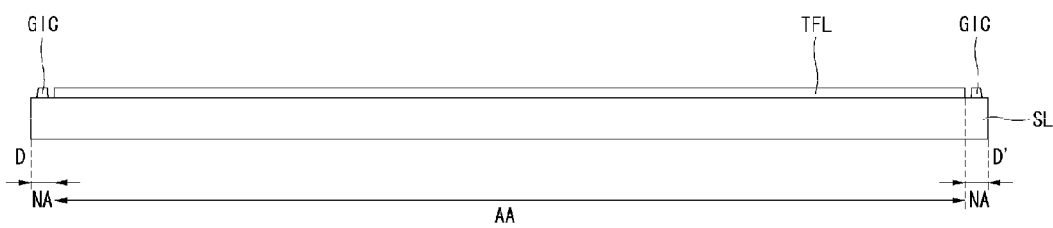
FIGS. 9A to 9D are cross-sectional views illustrating the method for manufacturing the 3D display panel along the cutting line D-D' in FIG. 8, according to the third embodiment.

At first, for the thin film transistor substrate, a transparent lower substrate SL is prepared. As shown in FIG. 9A, on the inner surface of the transparent lower substrate SL, the pixel areas disposed in a matrix type are defined by forming the gate lines and the data lines crossing each other. In each pixel area, thin film transistor and the pixel electrode driven by the thin film transistor are formed. In the FIG. 9A, the layer including the display driving elements such as the thin film transistors and the pixel electrodes are illustrated as the thin film transistor layer TFL, simply.

The thin film transistor layer TFL defining the pixel area is disposed in the display area AA for representing the video data. And, the outer area of the display area AA can be defined as the non-display area NA. The non-display area NA is the area in which the sealant SE (not shown) is disposed for joining and sealing the upper substrate SU and the lower substrate SL. In the non-display area NA, further, the gate driving IC GIC for driving the thin film transistor layer TFL can be formed. It is preferable that the gate driving IC GIC is formed with the thin film transistors similar to those found in the thin film transistor layer TFL. That is, the gate driving IC GIC according to the third embodiment has much smaller size than the driving IC mounted on the lower substrate SL in the first embodiment, and formed on the lower substrate SL directly.

Even though not shown in drawings, as an upper layer of the lower substrate SL having the thin film transistor layer TFL, an over coat layer may be further included. On the over coat layer OC, the alignment layer for deciding the initial alignment of the liquid crystal molecules may be further disposed. Otherwise, the over coat layer OC itself may be used as the alignment layer.

Figure 9B:
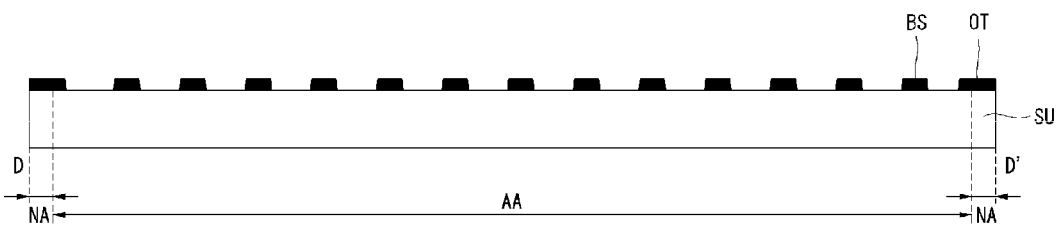

Next, for the color filter substrate, a transparent upper substrate SU is prepared. As shown in FIG. 9B, on one surface (i.e., outer surface), the black strip BS and an outer strip OT are formed. Especially, in the third embodiment, the black matrix BM is not formed between the color filter CF, but on the outer surface of the upper substrate SU. Therefore, in the third embodiment, eventually, the black strip BS has the same shape of black matrix BM in the first embodiment, the grid shape disposed in horizontal direction and the vertical direction to distinguish each pixel area. That is, the black strip BS, working as the horizontal black matrix BMH, is formed between the unit patterned retarder RT1 and RT2. And, the vertical black matrix BMV (otherwise it is also called as a 'vertical black strip') is disposed between each pixel column. As the horizontal black matrix BMH and the black strip BS become one element and it is formed on the outer surface of the upper substrate SU, the cross-talk can be prevented and the front aperture ratio can be ensured, effectively.

In the interim, the outer strip OT is preferably formed as covering the non-display area NA. Specifically, the outer strip OT may connect the vertical black matrix BMV and all black strips BS on the outer surface of the upper substrate SU and be disposed at the four sides of the upper substrate SU surrounding the display area AA. Furthermore, as the vertical black matrix BMV, the black strip BS and the outer strip OT include the opaque metal material, they work as the back surface electrode BIT in the first embodiment. That is, without the back surface electrode BIT, the black strip BS and the outer strip OT can remove the static electricity which may be charged during the manufacturing of the display panel DP.

Figure 9C:
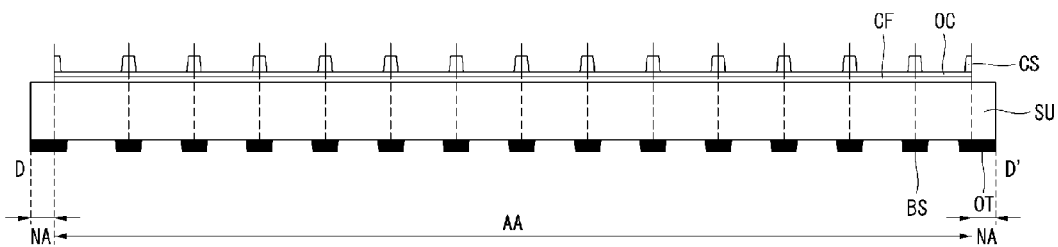

As shown in FIG. 9C, turning over the upper substrate SU, the color filter CF is formed in the area corresponding to the pixel area defined by the vertical black matrix BMV and the black strip BS, on the other surface (i.e. inner surface). On the color filter CF, the over coat layer OC is disposed as covering the whole surface. Even though it is not shown in drawings, on the over coat layer OC, an alignment layer for deciding the initial alignment of the liquid crystal molecules may be further disposed. Otherwise, the over coat layer OC itself may be used as the alignment layer. On the over coat layer OC, the column spacer CS is formed for maintaining the cell gap between the thin film transistor substrate and the color filter substrate. The column spacer CS is preferably formed within the area of the vertical black matrix BMV and/or the black strip BS.

Figure 9D:
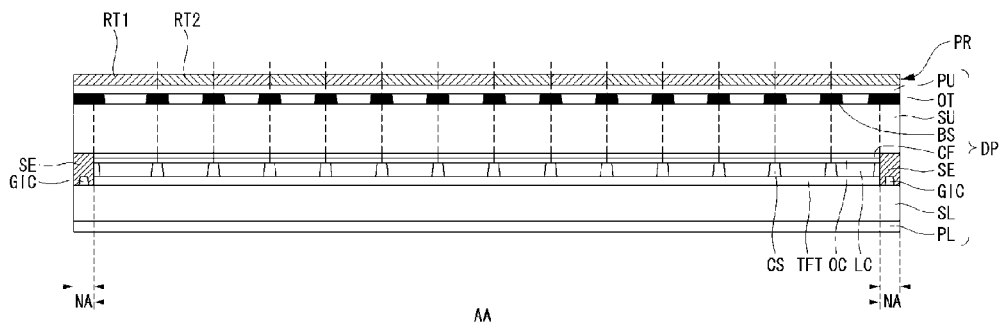

As shown in FIG. 9D, the thin film transistor substrate and the color filter substrate are joined to each other with the liquid crystal layer LC therebetween. By the column spacer CS, the cell gap between the upper substrate SU and the lower substrate SL can be maintained constantly. The upper substrate SU and the lower substrate SL are completely sealed by the sealant SE disposed in the non-display area NA. On the outer surface of the lower substrate SL, the lower polarization film PL is attached. In the same manner, on the outer surface of the upper substrate SU, the upper polarization film PU is attached. Furthermore, on the upper polarization film PU, the patterned retarder for representing the 3D images is attached. Especially, the patterned retarder PR is preferably formed in film type.

Referring to FIG. 9D again, the vertical black matrix BMV, and the black strip BS replacing the horizontal black matrix BMH are formed on the outer surface of the upper substrate SU. Therefore, when compared with the first embodiment, it can be said that, the black strip BS is omitted, and the black matrix BM formed on the inner surface of the upper substrate SU is moved on the outer surface of the upper substrate SU. That is, when viewing in front of the display panel, by comparing with the conventional 2D display device, the front aperture ratio is not inferior. Therefore, when 3D video data is represented, the same brightness with that of the 2D video data can be ensured. Furthermore, as the black matrix BM (in this embodiment it is also the 'black strip BS') is located away from the color filter CF with the thickness of the upper substrate SU, the cross-talk problem between the left-eye image and the right-eye image can be prevented effectively.

Hereinafter, referring to FIGS. 10A to 10D, we will explain the method for manufacturing the patterned retarder type 3D display device having the black strips according to the fourth embodiment of the present disclosure. The method of the fourth embodiment can be applied to the first to third embodiments to form the color filter on the thin film transistor substrate instead of the upper substrate. For convenience, the fourth embodiment will be explained as if the color filter were being formed on the lower substrate in the third embodiment.

FIGS. 10A to 10D are cross-sectional views illustrating the method for manufacturing the 3D display panel, according to the fourth embodiment.

Figure 10A:
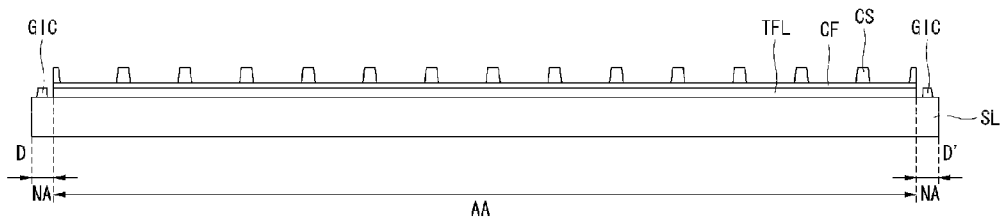
FIGS. 10A to 10D are cross-sectional views illustrating the method for manufacturing the 3D display panel, according to the fourth embodiment.

At first, for the thin film transistor substrate, a transparent lower substrate SL is prepared. As shown in FIG. 10A, on the display area AA of the inner surface of the transparent lower substrate SL, the pixel areas disposed in a matrix type are defined by forming the gate lines and the data lines crossing each other. In each pixel area, the thin film transistor layer TFL including thin film transistor and the pixel electrode driven by the thin film transistor is formed. On the thin film transistor layer TFL, a color filter CF is formed. On the color filter CF, a column spacer CS is formed. It is preferable that the column spacer CS is formed within the area which is overlapped with the black strip BS formed on the outer surface of the upper substrate SU. In the non-display area NA, the gate driving IC GIC for driving the element of the thin film transistor layer TFL is formed. It is preferable that the gate driving IC GIC is formed with the thin film transistors similar to those found in the thin film transistor layer TFL. That is, the gate driving IC GIC according to the fourth embodiment has much smaller size than the driving IC mounted on the lower substrate SL in the first embodiment, and is formed on the lower substrate SL directly.

Figure 10B:
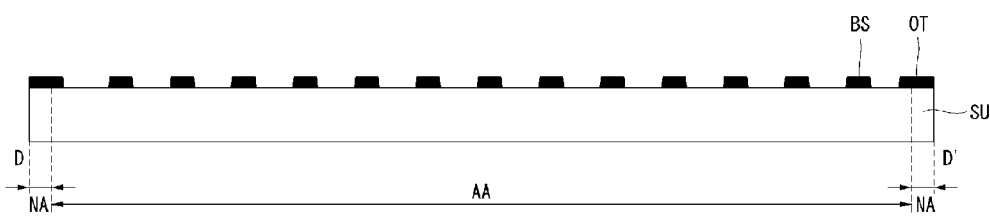

Next, a transparent upper substrate SU is prepared. As shown in FIG. 10B, on one surface (i.e., outer surface), the black strip BS and an outer strip OT are formed. Especially, in the fourth embodiment, the color filter CF is not formed on the upper substrate SU but on the lower substrate SL, so, it is not required to form the black matrix BM on the inner surface of the upper substrate SU. Therefore, in the fourth embodiment, the black strip BS is formed on the outer surface of the upper substrate SU having the same grid shape with the black matrix BM of the first embodiment in which it distinguishes the unit pixels by disposing therebetween. That is, the (horizontal) black strip BS, working as the horizontal black matrix BMH at the same time, is formed between the unit patterned retarder RT1 and RT2. And, the (vertical) black strip BS, working as the vertical black matrix BMV is disposed between each pixel column. Even though there is no black matrix BM, as the black strip BS having the same structure with the black matrix BM is formed on the outer surface of the upper substrate SU, cross-talk can be prevented and the aperture ratio can be maintained.

As shown in FIG. 10B, the outer strip OT is preferably formed as covering the non-display area NA. Specifically, the outer strip OT may connect the vertical black matrix BMV and all black strips BS on the outer surface of the upper substrate SU and be disposed at the four sides of the upper substrate SU surrounding the display area AA. Furthermore, as the vertical black matrix BMV, the black strip BS and the outer strip OT include the opaque metal material, they work as the back surface electrode BIT in the first embodiment. That is, without the back surface electrode BIT, the black strip BS and the outer strip OT can remove the static electricity which may be charged during the manufacturing of the display panel DP.

Figure 10C:
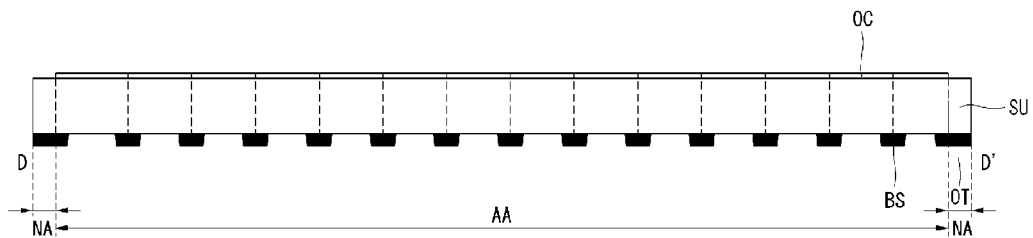

If required, as shown in FIG. 10C, turning over the upper substrate SU, an over coat layer OC may be formed on the inner surface of the upper substrate SU. Even though it is not shown in drawings, on the over coat layer OC, an alignment layer for deciding the initial alignment of the liquid crystal molecules may be further disposed. Otherwise, the over coat layer OC itself may be used as the alignment layer.

Figure 10D:
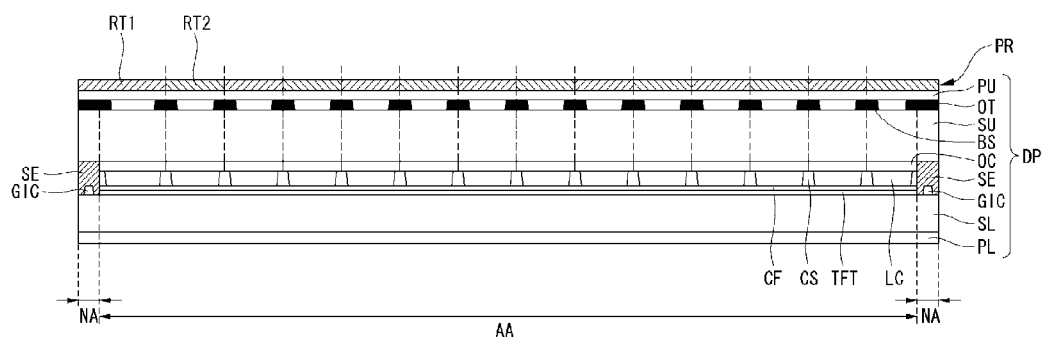

As shown in FIG. 10D, the lower substrate SL having the thin film transistor and the color filter, and the upper substrate SU having the black strip BS and the outer strip OT are joined to each other with the liquid crystal layer LC therebetween. By the column spacer CS, the cell gap between the upper substrate SU and the lower substrate SL can be maintained constantly. The upper substrate SU and the lower substrate SL are completely sealed by the sealant SE disposed in the non-display area NA. On the outer surface of the lower substrate SL, the lower polarization film PL is attached. In the same manner, on the outer surface of the upper substrate SU, the upper polarization film PU is attached. Furthermore, on the upper polarization film PU, the patterned retarder PR for representing the 3D images is attached. Especially, the patterned retarder PR is preferably formed in film type.

Even though not shown in drawings, as an upper layer of the lower substrate SL having the color filter CF, an over coat layer may be further included. On the over coat layer OC, the alignment layer for deciding the initial alignment of the liquid crystal molecules may be further disposed. Otherwise, the over coat layer OC itself may be used as the alignment layer.

The display panel according to the fourth embodiment of the present disclosure is similar to that of the third embodiment. The differences are that the color filter CF is directly formed on the thin film transistor layer TFL, and the column spacer CS is formed on the color filter CF. Therefore, the upper substrate SU has the black strip BS working as the black matrix and as the element for preventing cross-talk between the unit patterned retarder PR, and the outer strip OT for covering the GIP area and for using as the back surface electrode. That is, the manufacturing method for upper substrate SU is simpler than that of the third embodiment.

In the fourth embodiment mentioned above, the color filter CF is formed on the thin film transistor layer TFL. However, if required, the color filter CF may be formed on the lower substrate SL prior to forming the thin film transistor layer TFL. In this case, the upper most layer of the lower substrate SL. In that structure, the pixel electrode may be exposed to the observer, because the color filter CF is disposed under the pixel electrode. Especially, if the pixel electrode includes a metal material having high reflexibility or a colored metal material such as the nitride copper (CuNx) (copper material has yellowish color problem), then the outer strip OT may be remarkably recognized by the observer. This is caused by that the outer strip OT is also metal material but it is black, so the outer strip OT has lower reflexibility than the pixel electrode having higher reflexibility or yellowish color property. Therefore, the outer strip OT (the non-display area NA) is shown darker than pixel electrode (the display area AA) relatively.

In order to these problems, it is required that the difference between the light reflexibility of the pixel electrode and the light reflexibility of the outer strip OT should be controlled within 5%. For example, the pixel electrode should not include the colored metal material such as the copper but include the molybdenum-titanium (Mo—Ti) alloy or the indium tin oxide, or include multi-layered material of the molybdenum-titanium (Mo—Ti) alloy and the indium tin oxide (ITO). Otherwise, as the fourth embodiment mentioned above, the color filter CF would be formed on the thin film transistor layer TFL to remarkably reduce the light reflexibility of the pixel electrode by covering the pixel electrode.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A display device comprising:
    a first substrate;
    a second substrate in which a matrix of pixels are disposed, the pixels having first pixel borders oriented in a first direction that distinguish the pixels from each other, the second substrate joined with the first substrate;
    sealant connecting the first substrate and the second substrate in a non-display area of the display device that surrounds a display area;
    a liquid crystal layer disposed between the first substrate and the second substrate;
    first black strips disposed along the first pixel borders on an outer surface of the first substrate that faces away from the liquid crystal layer;
    a color filter that is separated from the first black strips by at least the first substrate and disposed on an inner surface of the first substrate that faces toward the liquid crystal layer; and
    an outer black strip disposed on the outer surface of the first substrate in the non-display area, the outer black strip overlapping with the sealant and connected to the first black strips.

2. The device according to the claim 1, wherein the second substrate includes:
    gate lines and data lines defining the pixels on an inner surface of the second substrate;
    thin film transistors connecting to the gate lines and the data lines;
    pixel electrodes formed in the pixels and connected to the thin film transistors; and
    driving elements disposed in the non-display area to drive the thin film transistors.

3. The device according to the claim 2, further comprising:
    second black strips disposed along the first pixel borders on the inner surface of the first substrate.

4. The device according to claim 1, wherein the first black strips and the outer strip comprise at least one of a molybdenum-titanium (Mo—Ti) alloy and a copper nitride (CuNx).

5. The device according to the claim 1, further comprising a patterned retarder disposed over the first black strips.

6. The device according to the claim 1, wherein the pixels also have second pixel borders oriented in a second direction that distinguish the pixels from each other, the second direction being perpendicular to the first direction, and further comprising:
    second black strips disposed along the second pixel borders on the outer surface of the first substrate.

7. The display device of claim 1, wherein the first substrate is a glass substrate.

8. A manufacturing method of a display device that includes a display area and a non-display area surrounding the display area, the method comprising:
    forming a first substrate that includes an upper substrate, first black strips disposed on an outer surface of the upper substrate, and an outer black strip disposed on the outer surface of the first substrate and connected to the first black strips;
    forming a second substrate in which a matrix of pixels are disposed, the pixels having first pixel borders oriented in a first direction that distinguish the pixels from each other; and
    joining the first substrate and the second substrate with a sealant in the non-display area such that the outer surface of the upper substrate faces away from a liquid crystal layer located between the first substrate and second substrate, the first black strips on the outer surface are disposed along the first pixel borders, and a color filter corresponding to the pixels is separated from the first black strips by at least the upper substrate and disposed on an inner surface of the upper substrate that faces toward the liquid crystal layer, the outer black strip overlapping with the sealant.

9. The method according to the claim 8, wherein forming the second substrate comprises forming the second substrate to include a lower substrate, gate lines and data lines defining the pixels on an inner surface of the lower substrate, thin film transistors connected to the gate lines and data lines, pixel electrodes in the pixels that are connected to the thin film transistors and driving elements in the non-display area to drive the thin film transistors.

10. The method according to the claim 9, wherein forming the first substrate further comprises:
    forming the color filter on the inner surface of the upper substrate; and
    forming column spacers overlapping with the first black strips.

11. The method according to the claim 9, wherein forming the first substrate further comprises:
    forming the color filter on the inner surface of the upper substrate;
    forming second black strips disposed along the first pixel borders on the inner surface of the upper substrate.

12. The method according to the claim 8, wherein the first black strips and the outer strip include at least one of a molybdenum-titanium (Mo—Ti) alloy and a copper nitride (CuNx).

13. The method according to the claim 8, further comprising forming a patterned retarder over the first black strips.

14. The method according to the claim 8, wherein the pixels have second pixel borders oriented in a second direction perpendicular to the first direction that distinguish the pixels from each other, and wherein forming the first substrate further comprises:
    forming second black strips disposed along the second pixel borders on the outer surface of the upper substrate.

* * * * *